(12) United States Patent
Zhang et al.

(10) Patent No.: US 11,026,126 B2
(45) Date of Patent: Jun. 1, 2021

(54) METHOD AND APPARATUS FOR FACILITATING MBMS RECEPTION

(71) Applicant: Telefonaktiebolaget LM Ericsson (publ), Stockholm (SE)

(72) Inventors: Zhang Zhang, Beijing (CN); Qianxi Lu, Beijing (CN); Marco Belleschi, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/345,881

(22) PCT Filed: Nov. 2, 2017

(86) PCT No.: PCT/CN2017/109102
§ 371 (c)(1),
(2) Date: Apr. 29, 2019

(87) PCT Pub. No.: WO2018/082606
PCT Pub. Date: May 11, 2018

(65) Prior Publication Data
US 2020/0120546 A1   Apr. 16, 2020

(30) Foreign Application Priority Data

Nov. 4, 2016   (WO) ............... PCT/CN2016/104660

(51) Int. Cl.
*H04W 36/00*  (2009.01)
*H04W 64/00*  (2009.01)
*H04W 36/14*  (2009.01)

(52) U.S. Cl.
CPC ... *H04W 36/0007* (2018.08); *H04W 36/0072* (2013.01); *H04W 36/00835* (2018.08); *H04W 36/14* (2013.01); *H04W 64/00* (2013.01)

(58) Field of Classification Search
CPC ..... H04W 76/10; H04W 28/06; H04W 24/10; H04W 4/46; H04W 72/0453;
(Continued)

(56) References Cited

U.S. PATENT DOCUMENTS

| | | | |
|---|---|---|---|
| 9,942,838 B2* | 4/2018 | Kim | H04W 8/005 |
| 10,477,441 B2* | 11/2019 | Blankenship | H04W 16/32 |

(Continued)

FOREIGN PATENT DOCUMENTS

| | | |
|---|---|---|
| CN | 104717614 A | 6/2015 |
| CN | 105282863 A | 1/2016 |
| WO | 2016068528 A1 | 5/2016 |

OTHER PUBLICATIONS

Author Unknown, "Technical Specification Group Core Network and Terminals; Numbering, addressing and identification (Release 13)," Technical Specification 23.003, Version 13.5.0, 3GPP Organizational Partners, Mar. 2016, 100 pages.

(Continued)

*Primary Examiner* — Khawar Iqbal
(74) *Attorney, Agent, or Firm* — Withrow & Terranova, PLLC

(57) ABSTRACT

Embodiments of the present disclosure provide methods, apparatuses and computer programs for facilitating MBMS reception. There is provided a method performed by a network node. The method comprises obtaining, for a terminal device served by a PLMN, PLMN information related to one or more PLMNs and providing the PLMN information to the terminal device, which can prepare for reception of MBMS from a PLMN other than the serving PLMN among the one or more PLMNs based on the PLMN information. The one or more PLMNs comprise at least one PLMN other than the PLMN serving the terminal device.

(Continued)

With embodiments of the present disclosure, performance of MBMS reception can be improved.

10 Claims, 15 Drawing Sheets

(58) Field of Classification Search
CPC ......... H04W 76/15; H04W 8/24; H04W 4/70; H04W 36/00; H04W 64/00; Y02D 70/20
See application file for complete search history.

(56) References Cited

U.S. PATENT DOCUMENTS

| | | | |
|---|---|---|---|
| 2015/0304122 A1 | 10/2015 | Pazos et al. | |
| 2016/0080996 A1* | 3/2016 | Fukuta | H04W 56/00 370/311 |
| 2017/0048682 A1* | 2/2017 | Chami | H04L 45/308 |
| 2017/0237817 A1* | 8/2017 | Sharma | H04W 48/10 370/331 |
| 2018/0049073 A1* | 2/2018 | Dinan | H04W 72/1263 |
| 2018/0049162 A1* | 2/2018 | Patil | H04W 72/04 |
| 2019/0082352 A1* | 3/2019 | Hua | H04W 72/048 |
| 2019/0174280 A1* | 6/2019 | Xu | H04L 67/12 |
| 2019/0372709 A1* | 12/2019 | Chendamarai Kannan | H04W 16/14 |
| 2019/0380069 A1* | 12/2019 | Park | H04W 36/36 |
| 2020/0045589 A1* | 2/2020 | Heden | H04W 36/08 |
| 2020/0068595 A1* | 2/2020 | Dinan | H04W 72/04 |
| 2020/0128572 A1* | 4/2020 | Dinan | H04W 72/1257 |
| 2020/0178048 A1* | 6/2020 | Kim | H04W 4/40 |
| 2020/0214023 A1* | 7/2020 | Patil | H04W 72/1242 |

OTHER PUBLICATIONS

Author Unknown, "Technical Specification Group Services and System Aspects; Multimedia Broadcast/Multicast Service (MBMS); Architecture and functional description (Release 13)," Technical Specification 23.246, Version 13.2.0, 3GPP Organizational Partners, Sep. 2015, 68 pages.

Author Unknown, "Technical Specification Group Services and System Aspects; Architecture enhancements for V2X services (Release 14)," Technical Specification 23.285, Version 0.1.0, 3GPP Organizational Partners, Jul. 2016, 14 pages.

Author Unknown, "Technical Specification Group Services and System Aspects; Architecture enhancements for V2X services (Release 14)," Technical Specification 23.285, Version 0.2.0, 3GPP Organizational Partners, Sep. 2016, 27 pages.

Author Unknown, "Technical Specification Group Services and System Aspects; Multimedia Broadcast/Multicast Service (MBMS); Protocols and codecs (Release 13)," Technical Specification 26.346, Version 13.4.0, 3GPP Organizational Partners, Mar. 2016, 236 pages.

Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.1.0, 3GPP Organizational Partners, Mar. 2016, 551 pages.

Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.2.0, 3GPP Organizational Partners, Jun. 2016, 623 pages.

Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.0.0, 3GPP Organizational Partners, Sep. 2016, 644 pages.

ETSI MCC, "Chairman Notes—Skeleton Report," Third Generation Partnership Project (3GPP), TSG-RAN WG2 Meeting #93bis, Apr. 11-15, 2016, 89 pages, Dubrovnik, Croatia.

International Search Report and Written Opinion for International Patent Application No. PCT/CN2017/109102, dated Feb. 8, 2018, 10 pages.

* cited by examiner

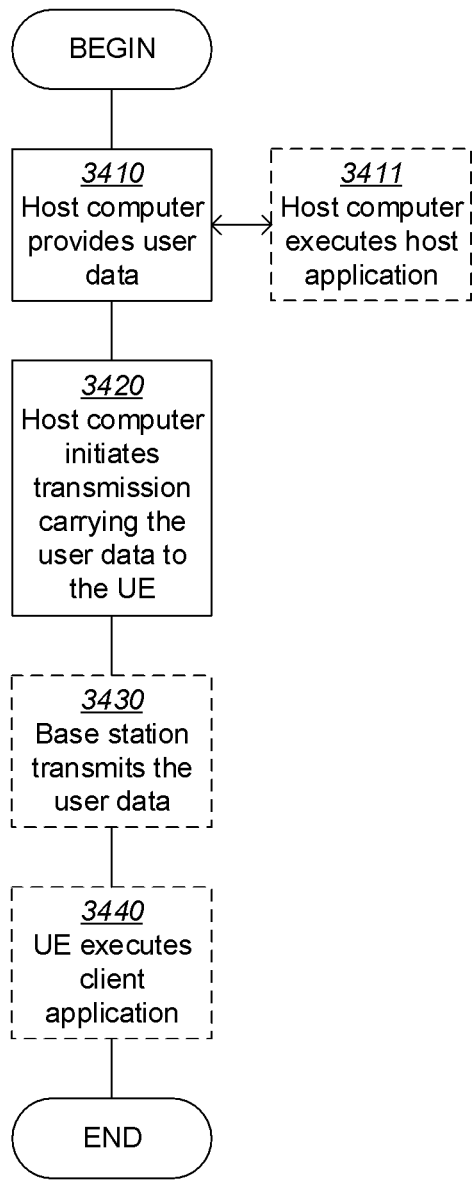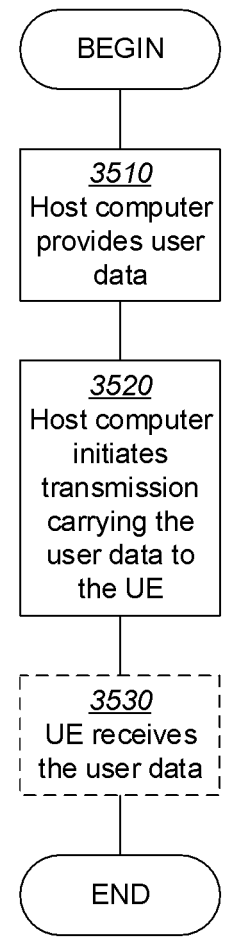
FIG. 14
FIG. 15

METHOD AND APPARATUS FOR FACILITATING MBMS RECEPTION

This application is a 35 U.S.C. § 371 national phase filing of International Application No. PCT/CN2017/109102, filed Nov. 2, 2017, which claims priority to International Application No. PCT/CN2016/104660, filed Nov. 4, 2016, the disclosures of which are incorporated herein by reference in their entireties.

TECHNICAL FIELD

The non-limiting and example embodiments of the present disclosure generally relate to the technical field of wireless communications, and specifically to a method, a network node, a terminal device, and a base station for facilitating inter-Public Land Mobile Network (PLMN) MBMS reception.

BACKGROUND

This section introduces aspects that may facilitate better understanding of the disclosure. Accordingly, the statements of this section are to be read in this light and are not to be understood as admissions about what is in the prior art or what is not in the prior art.

With the evolution of wireless communication, a requirement for device to device (D2D) communication (specified as "side-link") feature which targets at both commercial and Public Safety applications has been proposed. In the Third Generation Partnership Project (3GPP), the D2D communication feature has been introduced during the development of Release 12 (Rel-12) of the Long term evolution (LTE) standard. In 3GPP LTE Rel-14, an extension for the D2D work consists of supporting Vehicle-to-Everything (V2X) communication, which includes direct communication among vehicles, pedestrians and infrastructure, for example, vehicle to vehicle (V2V), vehicle to pedestrians (V2P) and vehicle to infrastructure (V2I). V2X communication may take advantage of network (NW) infrastructure when available, but at least basic V2X connectivity should be possible even in the case of lacking network coverage, e.g. via side-link.

An LTE-based V2X interface may be economically advantageous because of the LTE economies of scale and capability of tighter integration between communications with LTE NW infrastructure and V2X communications, as compared to using dedicated V2X technology. V2X communications may carry both non-safety and safety information, where each of applications and services may be associated with a specific set of requirements, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM).

The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages.

The DENM message is event-triggered, such as by braking, and the availability of a DENM message is also checked for every 100 ms.

Depending on various use cases, latency requirements for CAM and DENM may vary significantly. As an example, the latency may vary from 20 ms for pre-crash warnings, to 100 ms for an emergency stop, or queue warnings, or 1000 ms for non-safety related use cases such as traffic flow optimization, curve speed warnings etc.

The Society of Automotive Engineers (SAE) has also defined the Basic Safety Message (BSM) for Dedicates Short Range Communications (DSRC) with various messages sizes.

V2X mainly aims at a high load scenario in urban environments, where downlink (DL) unicast bearers for each vehicle are not efficient or practical, since the content to be provided to the vehicle in proximity is similar or the same. Therefore, it is straightforward to use (Evolved)-Multicast Broadcast Multimedia Services (eMBMS) technology to serve vehicles in downlink (DL).

From Radio Access Network (RAN) perspective, MBMS transmissions can be realized with Multimedia Broadcast Multicast Service Single Frequency Network (MBSFN) or Single Cell Point To Multiploint (SC-PTM).

In MBSFN, a same content of an MBMS bearer, which corresponds to a specific service identified by a Temporary Mobile Group Identity (TMGI), is transmitted from different cells belonging to a same MBMS area which may span a very large area. The transmissions from the different cells are time-synchronized so that the resulting signal will, from a terminal point of view, appear as a transmission from a single cell. Obviously, in order to realize such a combining gain at UE, all the cells joining the same MBMS session should coordinate their scheduling decisions. In MBSFN, the scheduler is not located in an eNB, but in a Multi-cell/multicast Coordination Entity (MCE) node which can coordinate scheduling allocations for multiple eNBs. MBSFN transmissions occur over a dedicated multicast transport channel (MCH) over which both control signalling (e.g. Multicast Control Channel MCCH) and data (e.g., Multicast Traffic Channel MTCH) are multiplexed. The scheduling information of the MCCH is carried in Information Element (IE) SystemInformationBlockType13 (SIB13), as defined in 3GPP TS 36.331 v13.2.0.

In SC-PTM, multicasting of MBMS data is not executed simultaneously from multiple cells as in MBSFN, but it is limited to a single cell area. Multicast transmissions of both control signalling and data are sent over Physical Downlink Shared Channel (PDSCH) and scheduled by an eNB. Similar to MBSFN, SC-PTM also has a control signal (SC-MCCH) which carries the SC-PTM configuration of the SC-MTCH channels (up to 1023). The scheduling information of the SC-MCCH is carried in SIB20, as defined in 3GPP 36.331 v13.2.0.

At present, mobility procedures for reception of MBMS messages (which will be simplified as MBMS reception) allow a UE to start or continue receiving MBMS message(s) when changing cell(s). UEs that are receiving MBMS message(s) in RRC_IDLE state and performing cell reselection or are in RRC_CONNECTED state obtain target cell MTCH information from the target cell MCCH.

In order to avoid the need to read MBMS related system information and potentially MCCH on neighboring frequencies, a UE is made aware of which frequency is providing which MBMS service(s) via MBSFN through a combination of User Service Description (USD) and system information.

In the USD, as defined in 3GPP TS 26.346 v13.4.0, the application/service layer provides, for each service, Temporary Mobile Group Identity (TMGI), session start and end times, frequencies and MBMS service area identities (MBMS SAIs) (as defined in 3GPP TS 23.003 v13.5.0) belonging to an MBMS service area, as defined in 3GPP TS 23.246 v13.2.0.

MBMS and non-MBMS cells indicate in SystemInformationBlockType15 (SIB15) the MBMS SAIs of the current frequency and of each neighboring frequency, as described in 3GPP TS 36.331 v13.1.0.

The MBMS SAIs of a neighboring cell, possibly on neighboring frequencies, may be provided by X2 signaling (i.e. during X2 Setup and eNB Configuration Update procedures) and/or Operation Administration and Maintenance (OAM).

A UE can determine the frequency on which a MBMS service is provided according to the following rule: if the serving cell of the UE provides SIB15, the UE considers that a frequency is providing the MBMS service via MBSFN if and only if one of the MBMS SAI(s) of this frequency as indicated in SIB15 of the serving cell is indicated for this MBMS service in the USD; and if the serving cell does not provide SIB15, the UE in RRC_IDLE state may consider that a frequency included in the USD for the MBMS service is providing this MBMS service, as long as the UE reselects a cell where SIB13 is provided. SIB 13 contains the information required to acquire the MBMS control information associated with one or more MBSFN area, as described in 3GPP TS 36.331 v13.1.0.

It has been agreed that for traffic safety reasons, inter-PLMN reception of MBMS messages needs to be ensured so that messages generated by a vehicle in a certain PLMN can also be received by other nearby devices that operate in another PLMN. The UE should be capable of performing uplink/downlink operations in its serving PLMN, while receiving MBMS messages from another non-serving PLMN. In order to enable this function, USD per PLMN for V2X services is required.

Besides the existing MBMS service announcement mechanisms as specified in 3GPP TS 26.346 v13.4.0 and 3GPP TS 23.246 v13.2.0, a USD per PLMN may be obtained from a V2X Application Server (AS), either via V1 reference point or V2/V3 reference points. FIG. 1 represents Inter-PLMN reference architecture for PC5 and LTE-Uu based V2X communication as described in 3GPP TS 23. 285 v0.1.0, in which the V2X Application Server may connect to V2X Control Functions belonging to multiple PLMNs; V1 refers to a reference point between the V2X application in a UE and in the V2X Application Server; V2 refers to a reference point between the V2X Application Server and the V2X Control Function in the operator's network; and V3 refers to a reference point between the UE and the V2X Control Function in the operator's network. Other functions, elements and reference points of FIG. 1 are defined in 3GPP TS 23.285 v0.1.0 and will be referred to herein by entirety when needed. After obtaining the USD, the UE could read SIB15 from a non-serving PLMN and know from which cell/frequency in that PLMN it could receive V2X service over MBMS, and then start the reception of MBMS messages.

SUMMARY

Various embodiments of the present disclosure mainly aim at providing methods, apparatuses and computer programs for facilitating MBMS reception. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method performed by a network node. The method comprises obtaining, for a terminal device served by a PLMN, PLMN information related to one or more PLMNs and then providing the PLMN information to the terminal device. The terminal device can prepare for reception of MBMS from a PLMN other than the serving PLMN among the one or more PLMNs based on the PLMN information. The one or more PLMNs comprise at least one PLMN other than the PLMN serving the terminal device.

In an embodiment, the PLMN information may indicate a list of identities of the one or more PLMNs and a list of service area identities, SAIs, for a PLMN of the one or more PLMNs.

In another embodiment, the one or more PLMNs exclude the PLMN serving the terminal device.

In a further embodiment, the method also comprises obtaining location information and serving cell information of the terminal device and determining neighboring cells in the one or more PLMNs for the serving cell of the terminal device based on the obtained location information and the serving cell information. The method further comprises generating information, with regard to the serving cell of the terminal device, including MBMS information and SAI information in relation to frequencies on which the neighboring cells operate and then providing the generated information, via the serving cell, to the terminal device together with the PLMN information in system information.

In yet another embodiment, determining the neighboring cells may further comprise classifying the terminal device into a terminal device group based on the received location information and then determining cells serving other terminal devices included in the terminal device group as the neighboring cells of the terminal device.

In yet another embodiment, the MBMS information may indicate at least one of an MBMS service provided on the serving cell of the terminal device and an MBMS service provided on a neighboring cell, while the SAI information may indicate identities of the SAIs associated with the MBMS services.

In yet another embodiment, the PLMN information may further include neighboring frequencies for the serving cell of the terminal device. In this embodiment, the method further comprises tracking a position of the terminal device, determining a frequency on which MBMS reception will be monitored by the terminal device based on the position, and indicating to the terminal device, via the serving cell of the terminal device, the determined frequency together with the PLMN information.

In a second aspect of the present disclosure, there is provided a method performed by a terminal device. The method comprises obtaining assistance information in system information received from a cell in a PLMN other than the PLMN serving the terminal device. The assistance information includes MBMS information and frequency information. The method further comprises providing a cell serving the terminal device with the assistance information. The assistance information will be used by the serving cell to update the system information.

In a third aspect of the present disclosure, there is provided a method performed by a base station. The method comprises receiving assistance information from a terminal device served by the base station. The assistance information includes MBMS information and frequency information obtained by the terminal device from a cell in a PLMN other than the PLMN serving the terminal device. The method also comprises updating system information broadcasted toward the terminal device with the assistance information.

In a fourth aspect of the present disclosure, there is provided an apparatus at a network node. The apparatus comprises a processor and a memory. The memory contains instructions executable by the processor, whereby the apparatus is operative to perform obtain, for a terminal device served by a PLMN, PLMN information related to one or more PLMNs and to provide the PLMN information to the terminal device. The terminal device can then prepare for reception of MBMS from a PLMN other than the serving PLMN among the one or more PLMNs based on the PLMN information. The one or more PLMNs comprise at least one PLMN other than the PLMN serving the terminal device.

In a fifth aspect of the present disclosure, there is provided an apparatus at a terminal device. The apparatus comprises a processor and a memory. The memory contains instructions executable by the processor whereby the apparatus is operative to obtain assistance information in system information received from a cell in a PLMN other than the PLMN serving the terminal device and provide a cell serving the terminal device with the assistance information. The assistance information includes MBMS information and frequency information and will be used by the serving cell to update the system information.

In a sixth aspect of the present disclosure, there is provided an apparatus at a base station. The apparatus comprises a processor and a memory. The memory contains instructions executable by the processor whereby the apparatus is operative to receive assistance information from a terminal device served by the base station and to update system information broadcasted toward the terminal device with the assistance information. The assistance information includes MBMS information and frequency information obtained by the terminal device from a cell in a Public Land Mobile Network PLMN other than the PLMN serving the terminal device.

According to the various aspects and embodiments as mentioned above, performance of inter-PLMN reception can be improved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIGS. 14 to 17 are flowcharts illustrating methods implemented in a communication system including a host computer, a base station and a user equipment.

DETAILED DESCRIPTION

Figure 1:
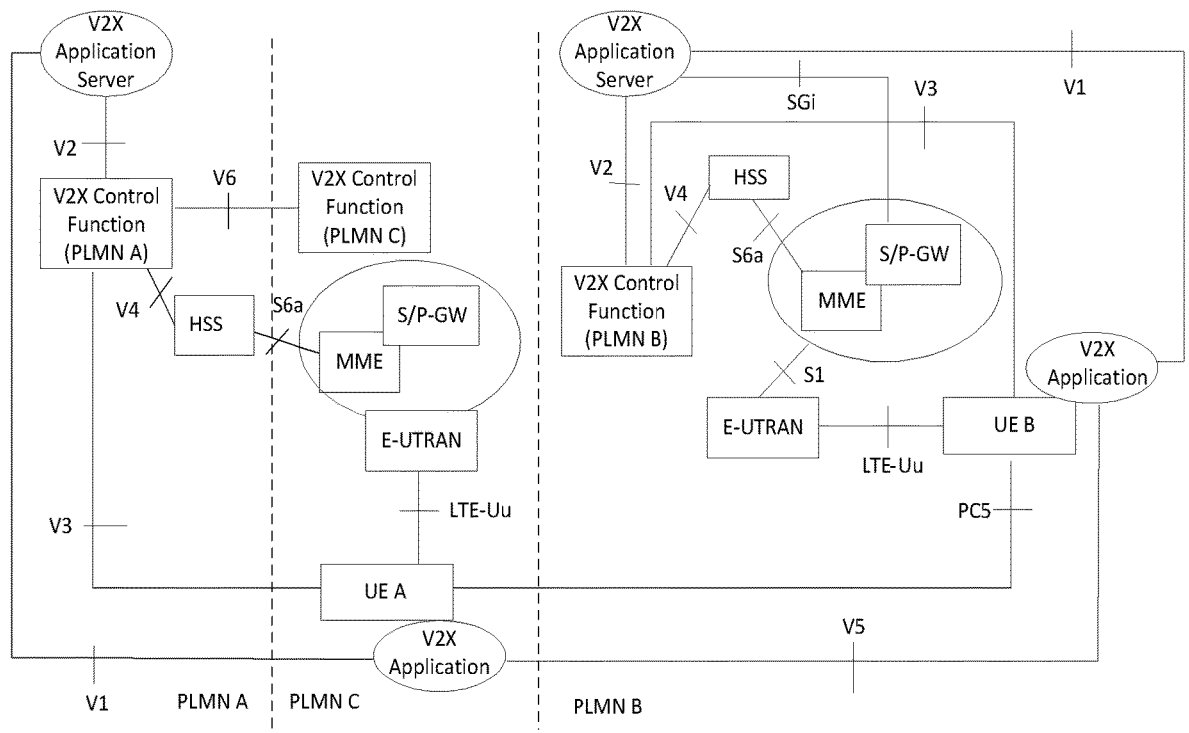
FIG. 1 represents Inter-PLMN reference architecture for PC5 and LTE-Uu based V2X communication as described in 3GPP TS 23. 285 v0.1.0.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "base station" may refer to a node B (NodeB or NB), an evolved NodeB (eNodeB or eNB), a gNB, a Remote Radio Unit (RRU), a radio head (RH), a remote radio head (RRH), a TRP (Transmission Reception Point), AN (access Node), a relay node (RN), or a low power node (LPN) such as a femto, a pico, an access point (AP) and so forth, depending on the applied terminology and technology.

The term "terminal device" refers to any end device having wireless communication capabilities. By way of example and not limitation, a terminal device may be referred to as user equipment (UE), which may be a Subscriber Station (SS), a Portable Subscriber Station, a Mobile Station (MS), or an Access Terminal (AT). The terminal device may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably.

According to the current standardization, e.g. 3GPP TS 36.331 v13.2.0, the IE SystemInformationBlockType15 contains a list of frequencies, including both the current frequency and neighboring frequencies, that provide MBMS services and the corresponding MBMS SAIs. However, this can only be used for frequencies from the same PLMN (more specifically, the serving PLMN), as SAI is unique within a PLMN. Therefore, it is impossible that SAIs in IE SIB15 span over multiple PLMNs. Thus, for inter-PLMN MBMS reception, a UE has to first perform PLMN/frequency/cell search and then read SIB15 from a non-serving PLMN. This may lead to increased latency for inter-PLMN MBMS reception.

Besides, it also needs to be appreciated that according to the current solutions, what MBMS service is provided on a frequency is relatively specific to the serving cell. That is, SIB 15 from a cell will indicate that a MBMS service is provided on a frequency of that cell and/or that some neighboring cells on that frequency provide the corresponding MBMS service. As mentioned in the Background, within a PLMN, the MBMS service and SAIs of the neighboring cells could be obtained by X2 signaling and/or OAM. But for cells belonging to different PLMNs, no solution has been proposed.

In order to solve at least part of the above problems, embodiments of the present disclosure will be described below with reference to FIGS. 1-12.

For illustrative purposes, several embodiments of the present disclosure will be described with reference to the architecture as shown in FIG. 1. Those skilled in the art will appreciate, however, that the concept and principle of embodiments of the present disclosure are not limited to this architecture.

Figure 2:
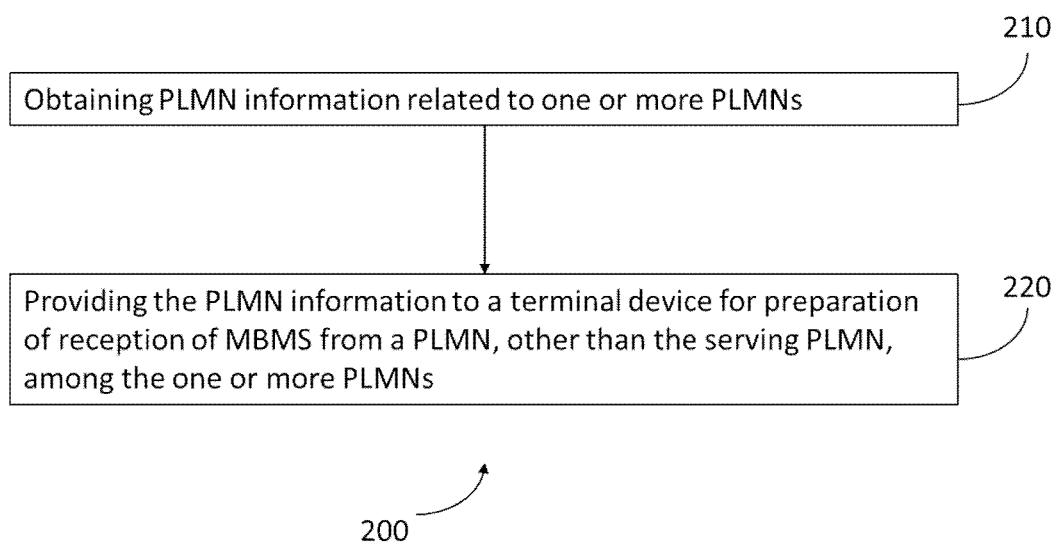
FIG. 2 illustrates a flowchart of a method 200 according to an embodiment of the present disclosure.

FIG. 2 illustrates a flowchart of a method 200 according to an embodiment of the present disclosure. The method 200 is performed by a network node, e.g., the V2X application server as shown in FIG. 1 when it is applied to V2X scenarios or other application nodes/servers in the application layer when it is applied to other scenarios. For ease of description, the method 200 will be described below with reference to the V2X application server. However, it is to be understood that the method 200 may also be performed by other suitable network nodes in the higher layer.

As illustrated, the method 200 is entered at block 210, in which the network node obtains PLMN information related to one or more PLMNs, e.g. from a terminal device served by the PLMN to which the network node belongs.

Since the network node is located in the higher layer, e.g. in the application layer, it can obtain various information related to multiple PLMNs. For example, the V2X Application Server (AS) may be able to know the cell deployment in a vast area, e.g. a whole country or a region. Thus, the V2X AS may know geographical locations (e.g. geographical location coordinates) of various cells and PLMNs operating in those cells and thus know neighboring cells/frequencies/SAIs for each cell and corresponding PLMN identities.

In an embodiment, the PLMN information may indicate a list of identities of the one or more PLMNs and a list of SAIs for a PLMN of the one or more PLMNs, e.g. for each PLMN. The PLMN information may also indicate an MBMS service corresponding to an SAI of the list of SAIs, e.g. indicating the MBMS service corresponding to each SM. Furthermore, the PLMN identity may be provided as an absolute identity or as an index in the PLMN identity list as included in system information (e.g. IE SIB1), e.g. identity value n may indicate the PLMN listed nth in that PLMN identity list.

In a further embodiment, the PLMN information may also indicate a list of frequencies, for each PLMN, that provide respective MBMS services.

In particular, the PLMN information may indicate the list of PLMN identities and the list of SAIs in various forms. For example, a PLMN identity may be attached to a SAI so that the 'SA1 plus PLMN identity' is unique across the one or more different PLMNs. When the terminal device obtains the PLMN information, it can abstract the PLMN identity attached to the SAI and know to which PLMN the SAI is related.

At block 220, the network node provides the PLMN information to a terminal device for preparation of reception of MBMS from a non-serving PLMN (i.e., a PLMN other than the PLMN currently serving the terminal device, which will be referred to as 'serving PLMN') among the one or more PLMNs. For the terminal device, the one or more PLMNs include at least one non-serving PLMN. For example, the network node may indicate the PLMN information to the serving cell of the terminal device, which then broadcasts the PLMN information in system information, e.g. in IE SIB15. A terminal device having received the PLMN information can prepare for, based on the PLMN information, e.g. monitor, reception of MBMS from a non-serving PLMN among the one or more PLMNs.

In another embodiment, the one or more PLMNs may not include the serving PLMN of the terminal device. The SAIs and/or corresponding frequency configurations may be assumed to be for the serving PLMN, when there is no explicit PLMN indication for the serving PLMN in the PLMN information. The advantage is that a legacy UE, which does not recognize the PLMN information in system information (e.g. SIB 15), could still read the system information properly.

By obtaining the PLMN information in advance, a terminal device may at least have knowledge of SAIs for non-serving PLMNs and differentiate the SAIs for different PLMNs. Accordingly, the terminal device can start or continue inter-PLMN MBMS reception, (at least) with no need to perform PLMN search, thus a reduced delay compared to the prior art.

There are two options for a terminal device to carry out inter-PLMN MBMS reception with the PLMN information available.

When non-serving PLMN information is not found in the system information, e.g. in SIB 15, the terminal device may first try to directly access the frequency in the non-serving PLMN(s) indicated in that SIB 15 if the MBMS service that the terminal device is interested in is provided there. If the access fails, the terminal device may try to search and read the system information, e.g. SIB 15, from the other non-serving PLMN(s) that are not listed in that SIB 15 received from its serving cell.

Alternatively, the terminal device may start to directly access the frequency in the non-serving PLMN(s) indicated in the system information, e.g. SIB 15, after receiving some enabling indicator saying "Ok to use the non-serving PLMN information" from the serving PLMN. This indication could be transmitted using a separate signaling or inserted into the system information, SIB 15. This enabling indicator could be a one-bit indicator for all non-serving PLMNs or a per-PLMN indicator. In the latter case, the terminal device directly accesses the frequency in the non-serving PLMN(s) indicated in the system information, SIB 15, only if the indictors for those specific PLMN(s) are enabled.

Figure 3:
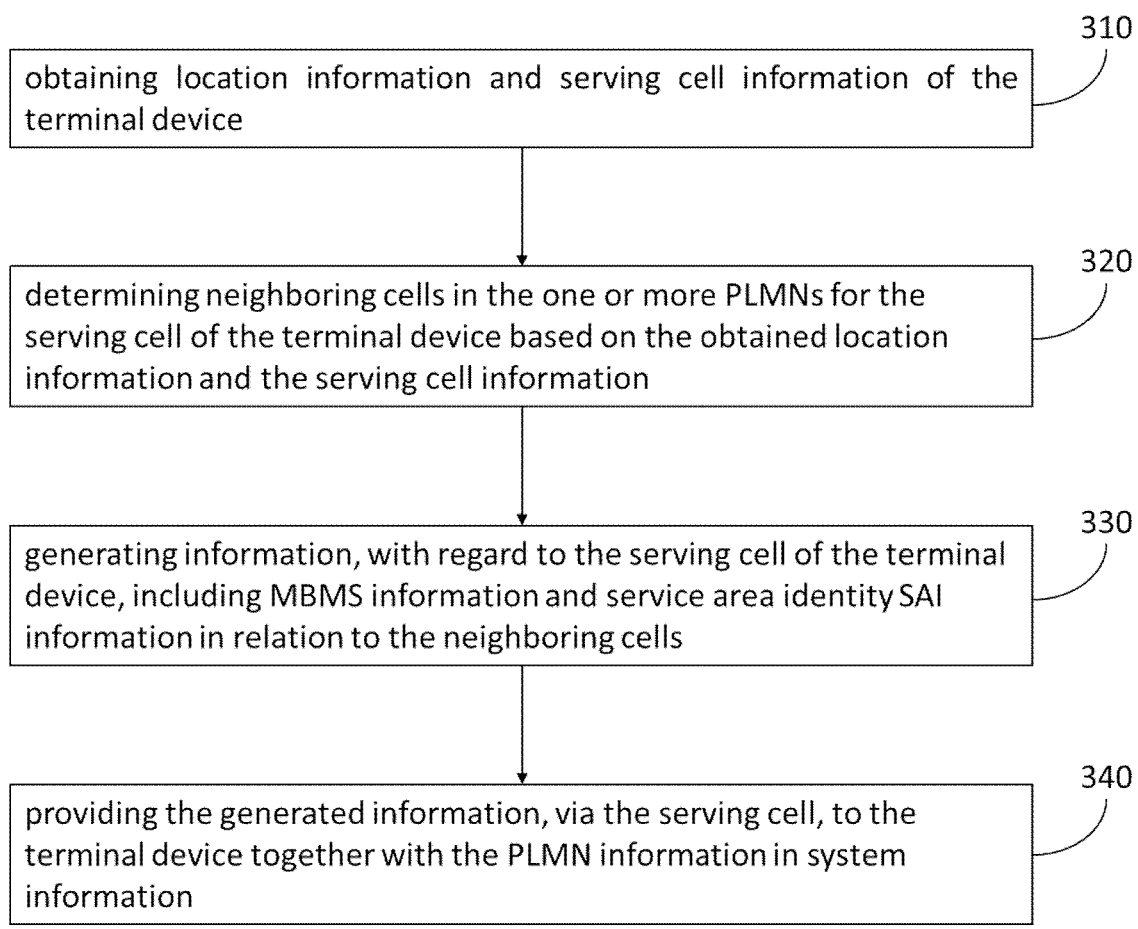
FIG. 3 shows further operations performed by the network node according to an embodiment of the method 200.

FIG. 3 shows further operations performed by the network node according to an embodiment of the method 200.

In this embodiment, the network may obtain, at block 310, location information and serving cell information of the terminal device and then based on the obtained information, determine neighboring cells in the one or more PLMNs for the serving cell of the terminal device at block 320. The determined neighboring cells may belong to the same or different PLMNs.

As an example, the network node may classify the terminal device into a terminal device group based on the received location information and then determine cells serving other terminal devices included in the terminal device group as the neighboring cells of the terminal device, no matter these cells belong to the same or different PLMNs.

At block 330, the network node may generate information, with regard to the serving cell of the terminal device, including MBMS information and SAI information in relation to frequencies on which the neighboring cells operate. For example, the MBMS information may indicate an MBMS service provided on the serving cell of the terminal device and/or an MBMS service provided on a neighboring cell, while the SAI information may indicate identities of the SAIs associated with the MBMS services.

At block 340, the network node may provide the generated information, via the serving cell, to the terminal device together with the PLMN information in system information, e.g. in IE SIB 15.

The operations at blocks 310-330 may be performed in parallel with, before or after the operation at block 210. The operation at block 340 may be performed together with the operation at block 220.

According to this embodiment, the MBMS services and corresponding SAIs of the neighboring frequencies in different PLMNs may also be known by the terminal device.

In a concrete example, a transmitting UE may provide its geographic location and serving Cell ID (e.g. E-UTRAN Cell Global Identifier (ECGI)) to the V2X AS via e.g. V1 reference point as shown in FIG. 1. The V2X AS naturally also knows which PLMN the transmitting UE belongs to, as each PLMN has its own Public Data Network (PDN) gateway.

The V2X AS may classify transmitting UEs into different groups based on their locations. For example, the transmitting UEs located within a certain range (e.g. at most x meters apart from each other) may be classified into a same group. Thus, a specific transmitting UE can be classified into a UE group based on its geographic location.

For the UEs in the same group, the serving cells of the corresponding transmitting UEs are regarded as neighboring cells to each other, no matter these cells are in the same or different PLMNs. With regard to a serving cell of a specific UE, the serving cells of other UEs in the same group as the specific UE may be determined as neighboring cells for the serving cell of the specific UE.

For each cell, the V2X AS may generate information (which will be called local information hereafter for ease of description without any limitation to the present disclosure), including MBMS information and SAI information. With regard to a serving cell of a specific UE, the V2X AS may generate the MBMS information indicating an MBMS service provided on the serving cell of the UE and/or an MBMS service provided on a neighboring cell, which may be on a different frequency, and the SAI information indicating identities of the SAIs associated with the MBMS services. The serving cell and neighboring cells could be from the same or different PLMNs.

Then, the V2X AS may inform the relevant cell of the local information via e.g. Broadcast Multicast Service Center (BM-SC). That cell accordingly generates and sends system information, e.g. IE SIB 15, in which the PLMN information is included. With regard to a specific UE, the V2X AS may inform the serving cell of the specific UE of the local information. That serving cell then provides the local information to the UE in system information together with the PLMN information.

Figure 4:
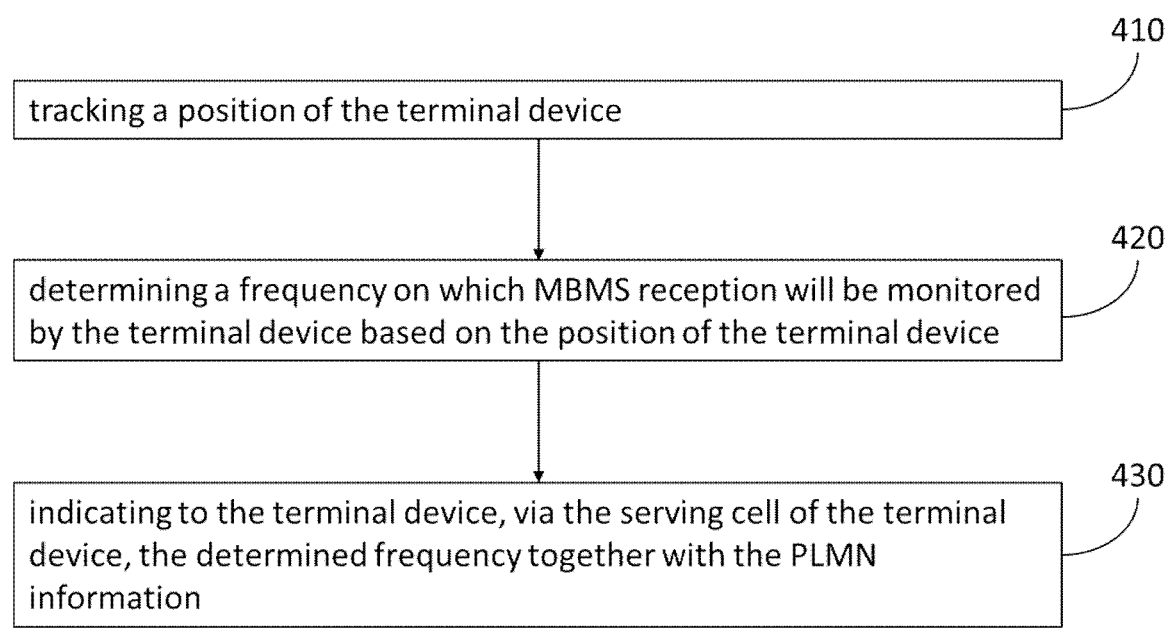
FIG. 4 shows further operations performed by the network node according to another embodiment of the method 200.

FIG. 4 shows further operations performed by the network node according to another embodiment of the method 200. Since the network node, e.g. the V2X AS in the higher layer, it is reasonable to assume that the V2X AS knows cell deployment in a vast area, e.g. a whole country or a region. Thus, the V2X AS may know geographical locations (e.g. geographical location coordinates) of various cells and PLMNs operating in those cells and thus know neighboring cells/frequencies for each cell and corresponding PLMN identities.

In this embodiment, the PLMN information may further indicate neighboring frequencies for the serving cell of the terminal device.

According to this embodiment, the network node may track, at block 410, a position of the terminal device and then determine a frequency on which MBMS reception will be monitored by the terminal device based on the tracked position at block 420.

At block 430, the network node indicates to the terminal device, via the serving cell of the terminal device, the determined frequency, e.g. by updating the USD with the determined frequency.

In a concrete example, the V2X AS tracks the position of a UE, e.g. by periodically receiving CAM messages containing the UE's geographical position. Depending on the geographical position where the UE is located, the V2X AS determines the frequencies and/or corresponding PLMN IDs that the UE may need to monitor for MBMS reception and then updates the USD with those frequencies and PLMN IDs.

The UE can store the USD indicating the frequencies and corresponding PLMN IDs.

The serving cell of the UE broadcasts in system information, e.g. SIB15, the neighboring frequencies indicated by the V2X AS.

The UE receives in the system information, e.g. SIB15, from the serving cell the neighboring frequencies and can then start monitoring for MBMS reception on those neighboring frequencies indicated in the system information SIB15, for which there is a match with the stored frequencies and corresponding PLMN ID indicated by the V2X AS.

The operations at blocks 410-420 may be performed in parallel with, before or after the operation at block 210. The operation at block 430 may be performed together with the operation at block 220.

Figure 5:
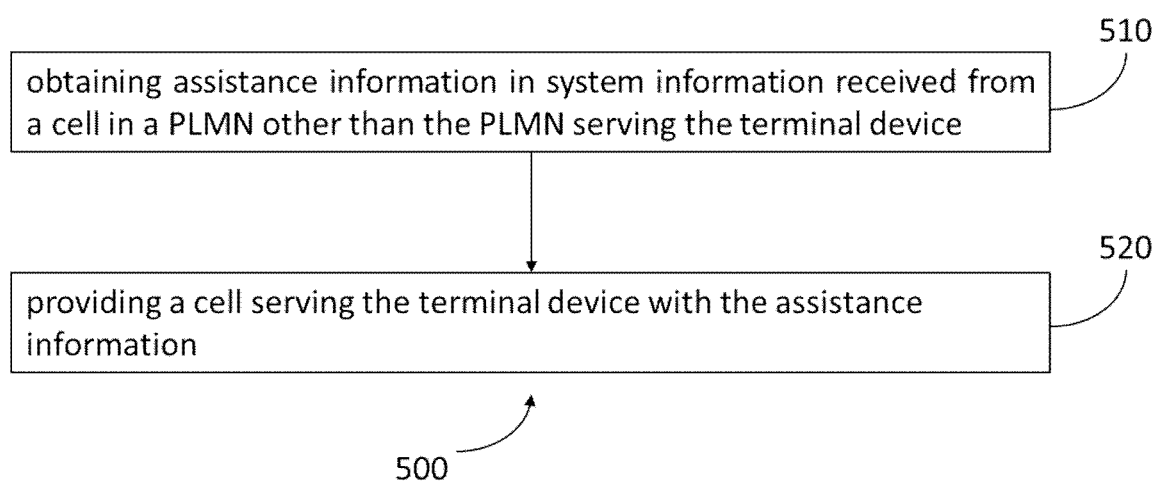
FIG. 5 illustrates a flowchart of a method 500 performed by a terminal device according to an embodiment of the present disclosure.

FIG. 5 illustrates a flowchart of a method 500 performed by a terminal device according to an embodiment of the present disclosure. By means of the method 500, the network can obtain at least part of the PLMN information as described above with reference to FIG. 2.

As illustrated, the method 500 is entered at block 510, in which the terminal device obtains assistance information in system information received from a cell in a PLMN (which will be referred to as 'non-serving PLMN' hereafter) other than the PLMN serving the terminal device. The assistance information includes at least MBMS information and frequency information.

For example, the MBMS information may indicate at least an MBMS service provided in a neighboring cell or frequency on which the neighboring cell operates in the PLMN other than the serving PLMN. The frequency information may indicate frequencies for the cell where the MBMS service is provided.

Then at block 520, the terminal device provides the serving cell of the terminal device with the assistance information, e.g. in response to a request from its serving cell, or periodically or for a certain number of times. The assistance information could be used by the serving cell to update the system information.

In particular, if the terminal device is in idle mode, it may temporarily switch to connected mode to send the assistance information to the serving cell. Alternatively, only a terminal device already in connected mode could send the assistance information, which may be configured by the network.

In an embodiment, the terminal device may also obtain signal quality information of a reference signal (RS) of the cell in the non-serving PLMN and then provide the serving cell of the terminal device with the signal quality information. Based on the signal quality information, the serving cell, particularly the base station of the serving cell, may decide whether to update the system information or not.

Figure 6:
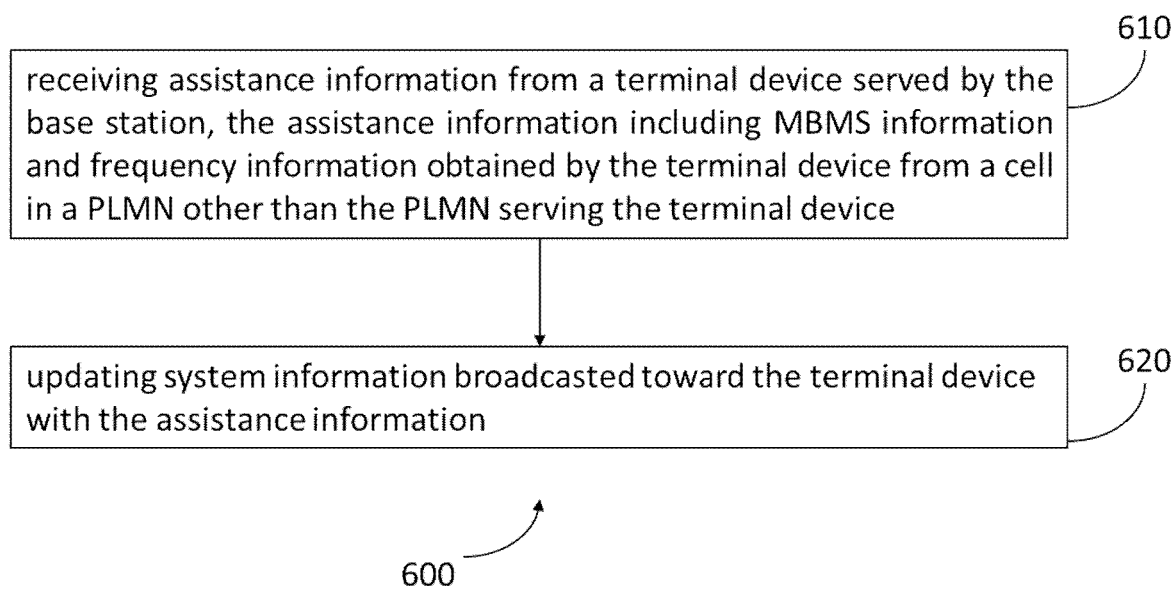
FIG. 6 illustrates a flowchart of a method 600 performed by a base station according to an embodiment of the present disclosure.

FIG. 6 illustrates a flowchart of a method 600 performed by a base station according to an embodiment of the present disclosure. Method 600 is the method performed at the counterpart side of the terminal device performing method 500.

As illustrated, the method 600 is entered at block 610, in which the base station receives assistance information from a terminal device served by it, the assistance information including MBMS information and frequency information obtained by the terminal device from a cell in a PLMN (i.e. non-serving PLMN) other than the PLMN serving the terminal device.

Similar to the above, the MBMS information may indicate at least an MBMS service provided in a neighboring cell or frequency on which the neighboring cell operates in the non-serving PLMN. The frequency information may indicate frequencies for the cell where the MBMS service is provided.

At block 620, the based station may update system information broadcasted toward the terminal device with the assistance information.

In an embodiment, the base station may also receive signal quality information of a reference signal of the cell in the non-serving PLMN and then decide whether to update the system information based on the signal quality information.

For example, the base station may update its system information, e.g. SIB 15, only if the RS quality of the serving cell of the terminal device is similar (e.g. the difference is smaller than a certain dB) to that of the cell in the non-serving PLMN. Moreover, there is no need to update the system information if it already contains sufficient relevant information for the cells/frequencies from the non-serving PLMNs By collecting assistance information from various terminal devices, the base station can have knowledge of cells/frequencies in the non-serving PLMNs. The serving cell of the terminal device, particularly the base station, may stop the terminal device or decrease the number of terminal devices to send the assistance information, for example in the case that the system information is not updated with non-serving PLMN related information for a predefined time period, or that the assistance information related to the same non-serving PLMN has been reported for predefined times. This could be performed per PLMN, i.e. the base station could stop the terminal devices or decrease the number of terminal devices sending the assistance information for a certain non-serving PLMN if the above criteria are satisfied for that PLMN.

Figure 7:
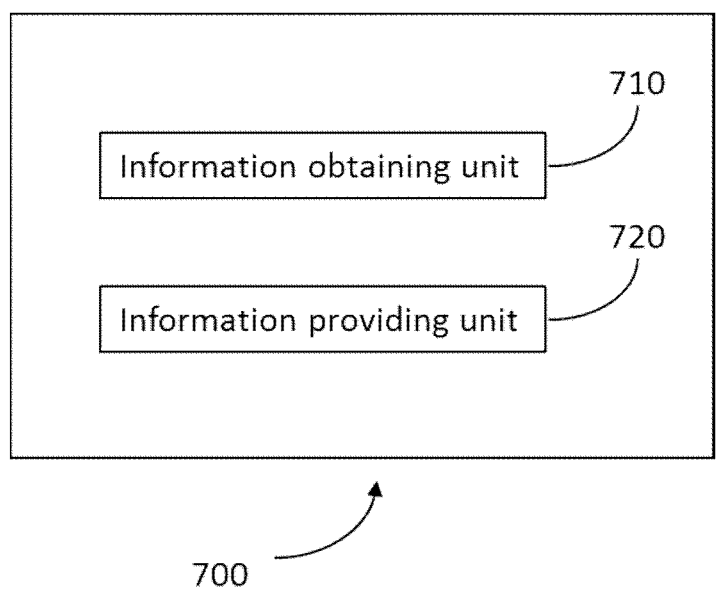
FIG. 7 illustrates a schematic block diagram of an apparatus 700 at a network node according to an embodiment of the present disclosure.

Reference is now made to FIG. 7, which illustrates a schematic block diagram of an apparatus 700 implemented in/as at least part of a network node, for example, the V2X AS as shown in FIG. 1 or other application nodes/servers in the application layer, according to an embodiment of the present disclosure. The apparatus 700 is operable to perform the method 200 as described with reference to FIGS. 2-4 and possibly any other related processes or methods. Some operations of the method 200 may also be performed by other related elements or entities.

As illustrated in FIG. 7, the apparatus 700 includes an information obtaining unit 710 and an information providing unit 720.

The information obtaining unit 710 is configured to obtain, for a terminal device served by a PLMN, PLMN information related to one or more PLMNs. The one or more PLMNs comprise at least one PLMN other than the PLMN serving the terminal device.

In an embodiment, the PLMN information may indicate a list of identities of the one or more PLMNs and a list of SAIs for a PLMN of the one or more PLMNs, e.g. for each PLMN. The PLMN information may also indicate an MBMS service corresponding to an SAI of the list of SAIs, e.g. indicating the MBMS service corresponding to each SAI. Furthermore, a PLMN identity may be provided as an absolute identity or as an index in the PLMN identity list as included in system information (e.g. SIB 1), e.g. identity value n may indicate the PLMN listed nth in that PLMN identity list.

In a further embodiment, the PLMN information may also indicate a list of frequencies, for each PLMN, that provide MBMS services.

The information providing unit 720 is configured to provide the PLMN information to the terminal device. The terminal device can prepare for reception of MBMS from a PLMN other than the serving PLMN among the one or more PLMNs based on the PLMN information.

In an embodiment, the apparatus 700 may further comprise a determining unit and an information generating unit (not shown).

In this embodiment, the information obtaining unit 710 may be further configured to obtain location information and serving cell information of the terminal device. The determining unit may be configured to determine neighboring cells or frequencies in the one or more PLMNs for the serving cell of the terminal device based on the obtained location information and the serving cell information. The information generating unit may be configured to generate information, with regard to the serving cell of the terminal device, including MBMS information and service area identity SAI information in relation to frequencies on which the neighboring cells operate. The information providing unit 720 may be further configured to provide the generated information, via the serving cell, to the terminal device together with the PLMN information in system information, e.g. IE SIB 15.

Particularly, the MBMS information may indicate an MBMS service provided on the serving cell of the terminal device and an MBMS service provided on a neighboring frequency, while the SAI information may indicate identities of the SAIs associated with the MBMS services.

In a further embodiment, the determining unit may be further configured to classify the terminal device into a terminal device group based on the received location information and to determine cells serving other terminal devices included in the terminal device group as the neighboring cells of the terminal device.

In another embodiment, the PLMN information may further include neighboring frequencies for the serving cell of the terminal device. In this embodiment, the apparatus 700 may further comprise a tracking unit (not shown) that is configured to track a position of the terminal device and a determining unit (not shown) that is configured to determine a frequency on which MBMS reception will be monitored by the terminal device based on the position. The information providing unit 720 may be further configured to indicate to the terminal device, via the serving cell of the terminal device, the determined frequency together with the PLMN information.

Figure 8:
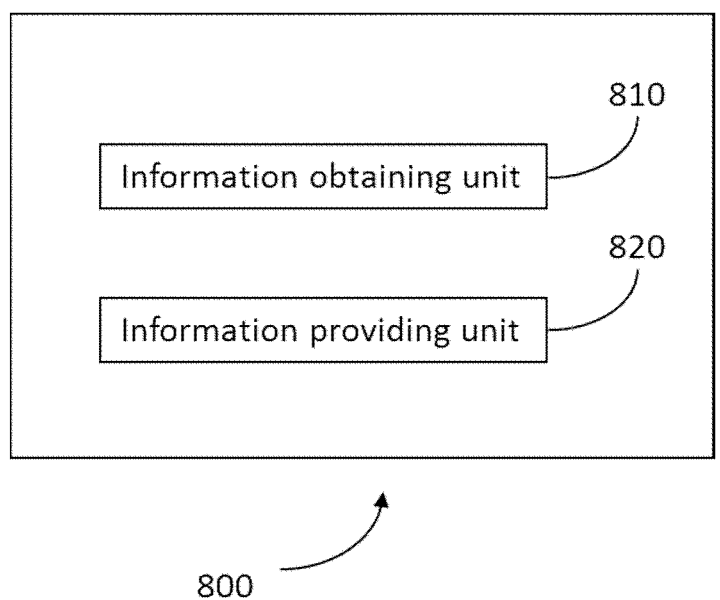
FIG. 8 illustrates a schematic block diagram of an apparatus 800 at a terminal device according to an embodiment of the present disclosure.

Reference is now made to FIG. 8, which illustrates a schematic block diagram of an apparatus 800 implemented in/as at least part of a terminal device according to an embodiment of the present disclosure. The apparatus 800 is operable to perform the method 500 as described with reference to FIG. 5 and possibly any other related processes or methods. It is also to be understood that some operations of the method 500 may be performed by one or more other elements or entities.

As illustrated in FIG. 8, the apparatus 800 includes an information obtaining unit 810 and an information providing unit 820.

The information obtaining unit 810 is configured to obtain assistance information in system information received from a cell in a PLMN other than the PLMN serving the terminal device. The assistance information includes MBMS information and frequency information. In particular, the MBMS information may indicate at least an MBMS service provided in a neighboring cell or frequency on which the neighboring cell operates in the PLMN other than the serving PLMN. The frequency information may indicate frequencies for the cell where the MBMS service is provided.

The information providing unit 820 is configured to provide the cell serving the terminal device with the assistance information. The assistance information will be used by the serving cell to update its system information.

In a further embodiment, the information obtaining unit 810 may be further configured to obtain signal quality information of a reference signal from the cell in the PLMN other than the serving PLMN, while the information providing unit 820 may be further configured to provide the serving cell of the terminal device with the signal quality information. Based on the signal quality information, the serving cell can decide whether to update the system information or not.

Figure 9:
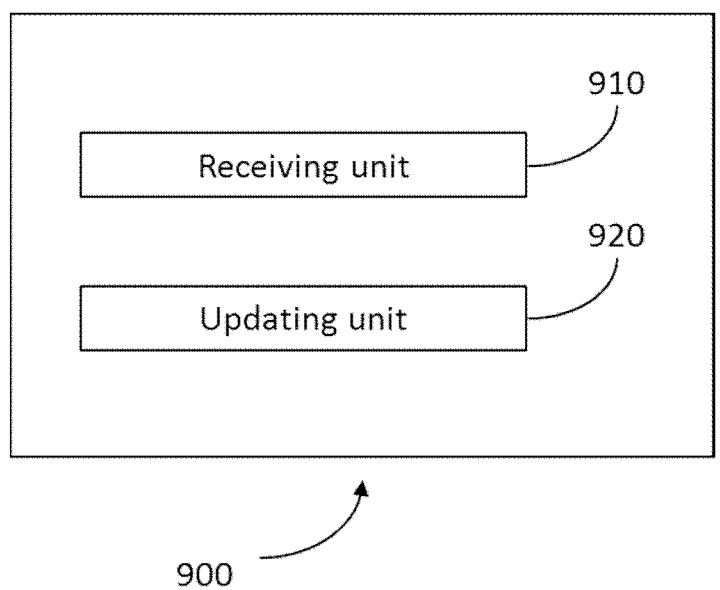
FIG. 9 illustrates a schematic block diagram of an apparatus 900 at a base station according to an embodiment of the present disclosure.

FIG. 9 illustrates a schematic block diagram of an apparatus 900 implemented in/as at least part of a base station according to an embodiment of the present disclosure. The apparatus 900 is operable to perform the method 600 as described with reference to FIG. 6 and possibly any other related processes or methods. It is also to be understood that some operations of the method 600 may be performed by one or more other elements or entities.

As illustrated in FIG. 9, the apparatus 900 includes a receiving unit 910 and an updating unit 920. The receiving unit 910 is configured to receive assistance information from a terminal device served by the base station. The assistance information includes MBMS information and frequency information obtained by the terminal device from a cell in a PLMN other than the PLMN serving the terminal device. In particular, the MBMS information may indicate at least an MBMS service provided in a neighboring cell or frequency on which the neighboring cell operates in the PLMN other than the serving PLMN. The frequency information may indicate frequencies for the cell where the MBMS service is provided.

The updating unit 920 is configured to update system information broadcasted toward the terminal device with the assistance information.

In a further embodiment, the receiving unit 910 may be further configured to receive signal quality information of a reference signal of the cell in the PLMN other than the serving PLMN. The apparatus 900 may further comprise a deciding unit configured to decide whether to update the system information based on the signal quality information.

Figure 10:
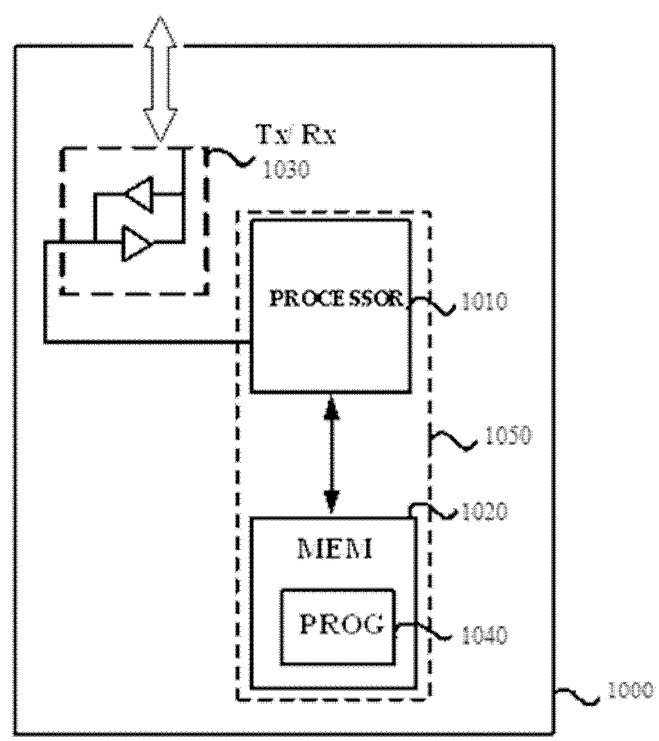
FIG. 10 illustrates a schematic block diagram of an apparatus 1000 at a network node according to another embodiment of the present disclosure.

FIG. 10 illustrates a simplified block diagram of an apparatus 1000 that may be embodied in/as at least part of a network node, e.g., V2X application server as shown in FIG. 1.

The apparatus 1000 may include at least one processor 1010, such as a data processor (DP) and at least one memory (MEM) 1020 coupled to the processor 1010. The apparatus 1000 may further include a transmitter TX and receiver RX 1030 coupled to the processor 1010. The MEM 1020 may be non-transitory machine/processor/computer readable storage medium and it may store a program (PROG) 1040. A combination of the at least one processor 1010 and the at least one MEM 1020 may form processing means 1050 adapted to implement various embodiments of the present disclosure as described with reference to FIGS. 2-4.

The PROG 1040 may include instructions that, when executed on the associated processor 1010, enable the apparatus 1000 to operate in accordance with the embodiments of the present disclosure, for example to perform the method 200 as described with reference to FIGS. 2-4.

Figure 11:
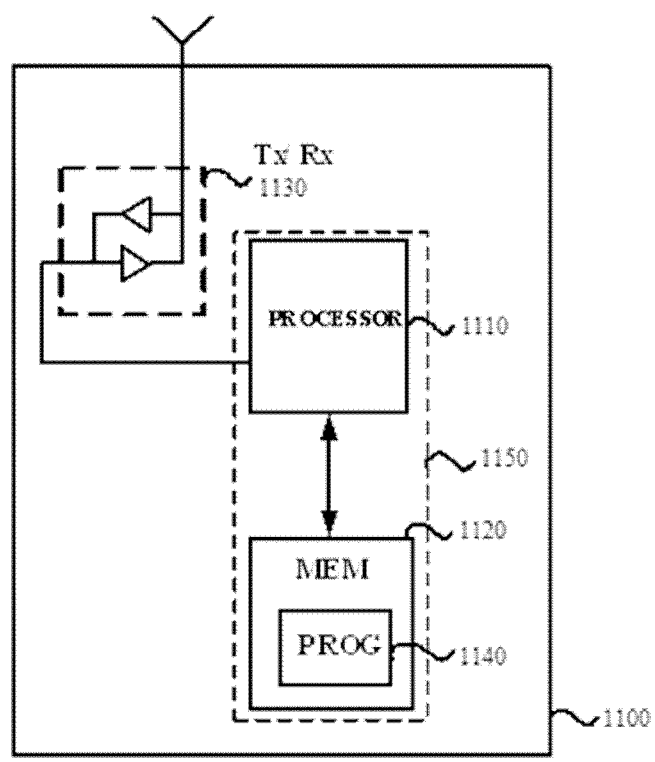
FIG. 11 illustrates a schematic block diagram of an apparatus 1100 at a terminal device or base station according to another embodiment of the present disclosure.

FIG. 11 illustrates a simplified block diagram of an apparatus 1100 that may be embodied in/as at least part of a terminal device or a base station.

The apparatus 1100 may include at least one processor 1110, such as a data processor (DP) and at least one memory (MEM) 1120 coupled to the processor 1110. The apparatus 1100 may further include a transmitter TX and receiver RX 1130 coupled to the processor 1110, which is capable of supporting radio communications. The MEM 1120 may be non-transitory machine/processor/computer readable storage medium and it may store a program (PROG) 1140. A combination of the at least one processor 1110 and the at least one MEM 1120 may form processing means 1150 adapted to implement various embodiments of the present disclosure as described with reference to FIGS. 5-6.

According to one implementation where the apparatus is embodied in or as at least part of the terminal device, the PROG 1140 may include instructions that, when executed on the associated processor 1110, enable the apparatus 1100 to operate in accordance with the embodiments of the present disclosure, for example to perform the method 500 as described with reference to FIG. 5.

According to another implementation where the apparatus is embodied in or as at least part of the base station, the PROG 1140 may include instructions that, when executed on the associated processor 1110, enable the apparatus 1100 to operate in accordance with the embodiments of the present disclosure, for example to perform the method 600 as described with reference to FIG. 6.

The MEMS 1020 and 1120 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 1010 and 1110 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a V2X communication scenario, it should not be construed as limiting the spirit and scope of the present disclosure. The principle and concept of the present disclosure may be more generally applicable to other scenarios.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules or units), or combinations thereof. For a firmware or software, implementation may be made through modules or units (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting n certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

Figure 12:
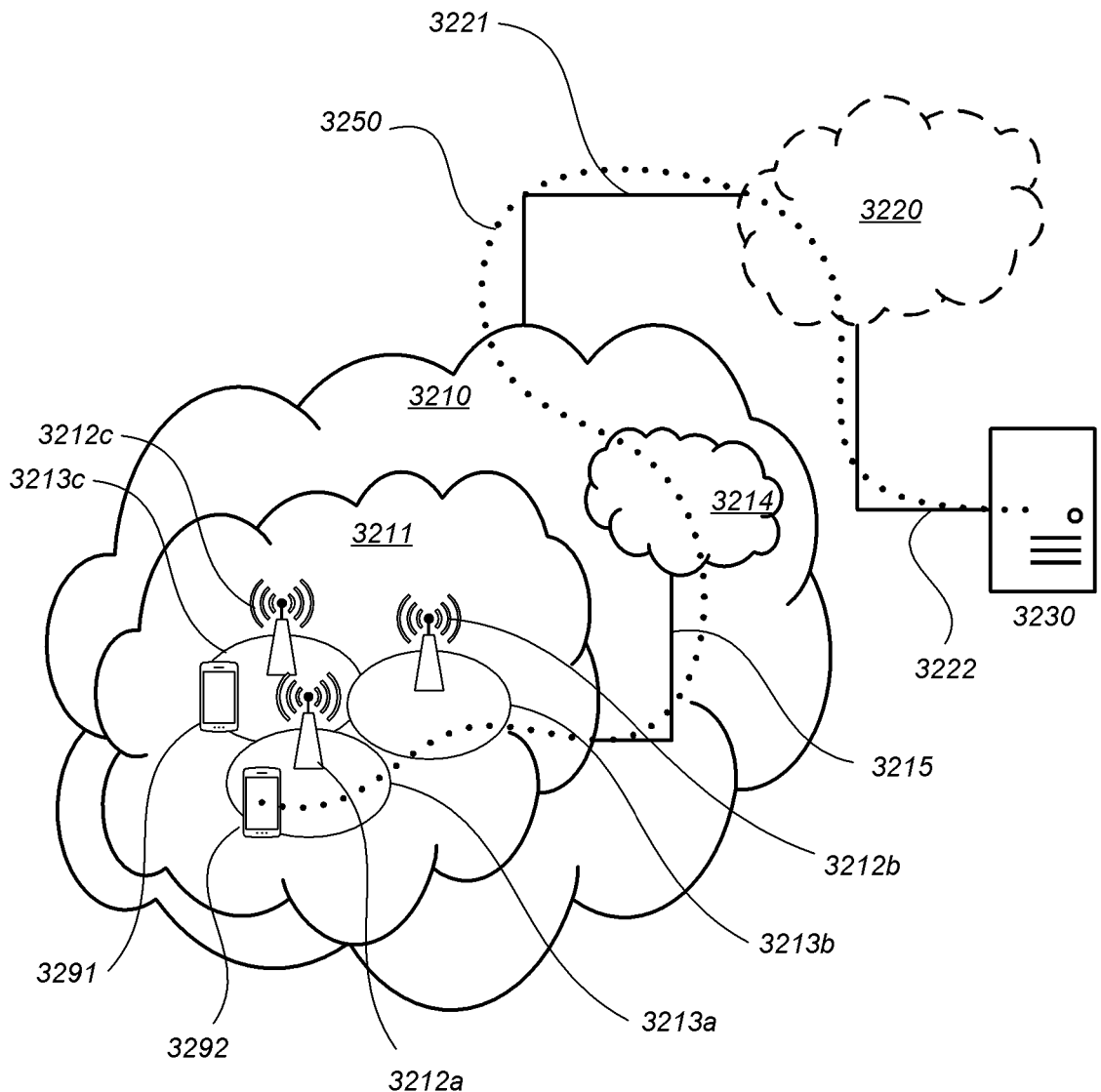
FIG. 12 schematically illustrates a telecommunication network connected via an intermediate network to a host computer.

Another aspect of the present disclosure provides a communication system, an example of which is illustrated in FIG. 12. With reference to FIG. 12, in accordance with an embodiment of the present disclosure, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 33) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 33 may be identical to the host computer 3230, one of the base stations 3212a, 3212b, 3212c and one of the UEs 3291, 3292 of FIG. 32, respectively. This is to say, the inner workings of these entities may be as shown in FIG. 33 and independently, the surrounding network topology may be that of FIG. 32.

Figure 13:
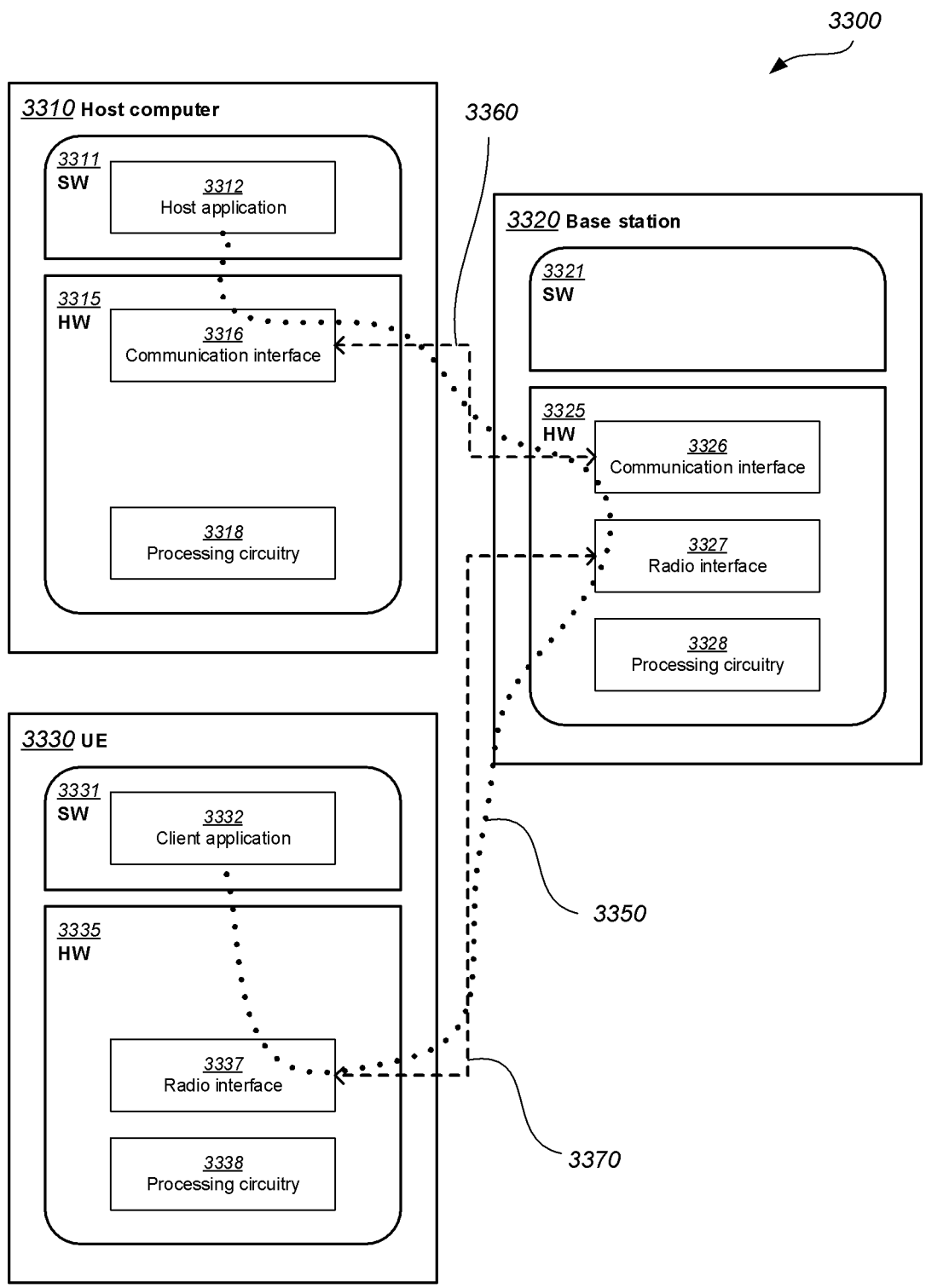
FIG. 13 is a generalized block diagram of a host computer communicating via a base station with a user equipment over a partially wireless connection.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance of inter-PLMN reception.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the nection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 16:
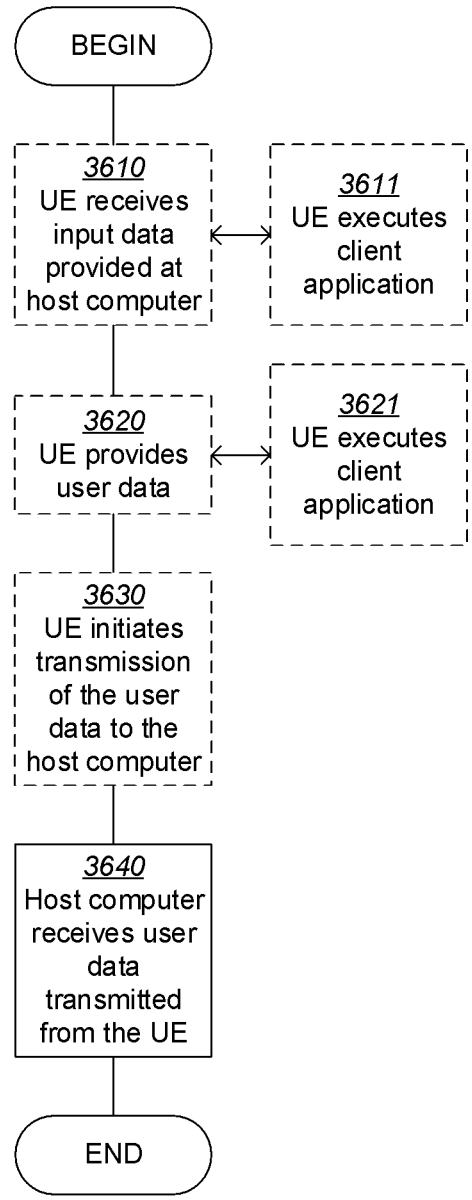

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 17:
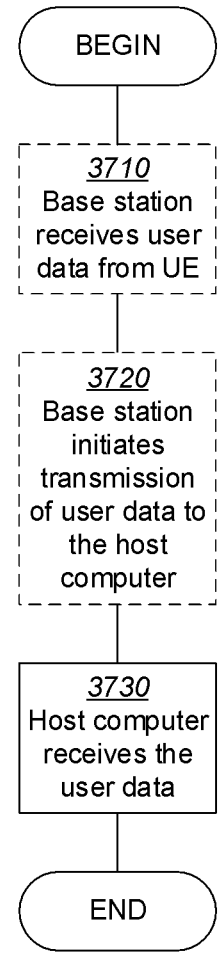

FIG. 17 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

What is claimed is:

1. A method performed by a network node, comprising:
obtaining Public Land Mobile Network (PLMN) information related to one or more PLMNs;
obtaining location information and serving cell information of a terminal device;
determining neighboring cells in the one or more PLMNs for a serving cell of the terminal device based on the obtained location information and the serving cell information, wherein the serving cell of the terminal device is in a serving PLMN that is currently serving the terminal device, wherein the neighboring cells in the one or more PLMNs for the serving cell of the terminal device are determined by:
classifying the terminal device into a terminal device group based on the obtained location information; and
determining cells serving other terminal devices included in the terminal device group as the neighboring cells of the terminal device;
generating local information, with regard to the serving cell of the terminal device, including Multimedia Broadcast Multicast Service (MBMS) information and service area identity (SAI) information in relation to frequencies on which the neighboring cells operate; and
providing the PLMN information and the generated local information, via the serving cell, to the terminal device for preparation of reception of MBMS from a non-serving PLMN, other than the serving PLMN, among the one or more PLMNs,
wherein the one or more PLMNs comprise at least one non-serving PLMN other than the serving PLMN for the terminal device.

2. The method according to claim 1, wherein the PLMN information indicates:
a list of identities of the one or more PLMNs; and
a list of service area identities, SAIs, for a PLMN of the one or more PLMNs.

3. The method according to claim 1, wherein:
the one or more PLMNs exclude the serving PLMN for the terminal device.

4. The method according to claim 1, wherein:
the MBMS information indicates at least one of an MBMS service provided on the serving cell of the terminal device and an MBMS service provided on a one of the neighboring cells; and
the SAI information indicates identities of the SAIs associated with the MBMS services.

5. The method according to claim 1, wherein:
the PLMN information further includes neighboring frequencies for the serving cell of the terminal device; and
the method further comprises:
tracking a position of the terminal device;
determining a frequency on which MBMS reception will be monitored by the terminal device based on the position; and
indicating to the terminal device, via the serving cell of the terminal device, the determined frequency together with the PLMN information.

6. A method performed by a terminal device, comprising:
obtaining assistance information in system information received from a non-serving cell in a non-serving Public Land Mobile Network (PLMN) other than a serving PLMN that is currently serving the terminal device, the assistance information including Multimedia Broadcast Multicast Service (MBMS) information and frequency information, wherein:
the MBMS information indicates at least an MBMS service provided in a neighboring cell or frequency on which the neighboring cell operates in the non-serving PLMN other than the serving PLMN; and
the frequency information indicates frequencies for the non-serving cell where the MBMS service is provided;
obtaining signal quality information of a reference signal from the non-serving cell in the non-serving PLMN other than the serving PLMN;
providing a serving cell in the serving PLMN with the assistance information; and
providing the serving cell with the signal quality information of the reference signal, the assistance information and the signal quality information being used by the serving cell to update the system information.

7. The method according to claim 6, wherein:
the assistance information is obtained and provided in response to a request from the serving cell.

8. A method performed by a base station, comprising:
receiving assistance information from a terminal device served by the base station, the assistance information including Multimedia Broadcast Multicast Service (MBMS) information and frequency information obtained by the terminal device from a non-serving cell in a non-serving Public Land Mobile Network (PLMN) other than a serving PLMN that is currently serving the terminal device, wherein:
the MBMS information indicates at least an MBMS service provided in a neighboring cell or frequency on which the neighboring cell operates in the non-serving PLMN other than the serving PLMN; and
the frequency information indicates frequencies for the non-serving cell where the MBMS service is provided;
receiving signal quality information of a reference signal of the non-serving cell in the non-serving PLMN other than the serving PLMN; and
updating system information broadcasted toward the terminal device with the assistance information and the signal quality information.

9. An apparatus at a terminal device, comprising:
a processor and a memory, said memory containing instructions executable by said processor whereby said apparatus is operative to:
obtain assistance information in system information received from a non-serving cell in a non-serving Public Land Mobile Network (PLMN) other than a serving PLMN that is currently serving the terminal device, the assistance information including Multimedia Broadcast Multicast Service (MBMS) information and frequency information, wherein:
the MBMS information indicates at least an MBMS service provided in a neighboring cell or frequency on which the neighboring cell operates in the non-serving PLMN other than the serving PLMN; and
the frequency information indicates frequencies for the non-serving cell where the MBMS service is provided;
obtain signal quality information of a reference signal from the non-serving cell in the non-serving PLMN other than the serving PLMN;

provide a serving cell that is serving the terminal device with the assistance information; and provide the serving cell with the signal quality information of the reference signal, the assistance information and the signal quality information being used by the serving cell to update the system information.

10. The apparatus according to claim 9, wherein:
the assistance information is obtained and provided in response to a request from the serving cell.

* * * * *